United States Patent [19]

Snover

[11] Patent Number: 5,040,807
[45] Date of Patent: Aug. 20, 1991

[54] COMBINED BEACH CHAIR AND WHEELBARROW APPARATUS

[76] Inventor: David E. Snover, 3440 A Russle Gulch Rd., Kittredge, Colo. 80457

[21] Appl. No.: 493,605

[22] Filed: Mar. 15, 1990

[51] Int. Cl.$^5$ ............................................. B62B 1/20
[52] U.S. Cl. ...................................... 280/30; 280/645; 280/653; 280/655; 280/43.1; 280/47.18; 280/47.31; 297/377; 298/1 B; 298/3
[58] Field of Search ............... 280/30, 38, 43.1, 47.18, 280/47.25, 47.26, 47.3, 47.31, 47.32, 641, 645, 651, 652, 653, 659, 655; 297/377; 298/3, 1 B; 403/92, 95

[56] References Cited

U.S. PATENT DOCUMENTS

| | | |
|---|---|---|
| 795,592 | 7/1905 | Edick ................................ 280/43.1 |
| 913,487 | 2/1909 | Fleischmann ....................... 280/653 |
| 2,840,142 | 6/1958 | Sands ............................. 297/377 X |
| 2,896,960 | 7/1959 | Whiting, Jr. .................. 280/47.26 X |
| 2,967,058 | 1/1961 | Hoffmann, Jr. ...................... 280/30 |
| 3,550,997 | 12/1970 | Strand ......................... 280/47.18 X |
| 3,693,993 | 9/1972 | Mazzarelli et al. ............ 280/47.18 X |
| 3,826,511 | 7/1974 | Frank ............................ 280/47.31 X |
| 3,997,213 | 12/1976 | Smith et al. ................... 280/47.18 X |
| 4,261,590 | 4/1981 | Schupbach ...................... 280/47.31 |
| 4,645,262 | 2/1987 | Furubotten ................... 280/47.29 X |
| 4,733,905 | 3/1988 | Buickerood et al. ........... 280/655 X |

FOREIGN PATENT DOCUMENTS

| | | | |
|---|---|---|---|
| 396444 | 4/1909 | France | ............... 280/47.31 |
| 854263 | 4/1940 | France | ............... 280/47.31 |
| 1325377 | 3/1963 | France | ............... 280/47.18 |
| 2210337 | 6/1989 | United Kingdom | ............... 280/652 |

Primary Examiner—Andres Kashnikow
Assistant Examiner—Brian L. Johnson
Attorney, Agent, or Firm—Henderson & Sturm

[57] ABSTRACT

A combined wheelbarrow and beach chair apparatus (10) comprising pivotally attached framework units (11) and (12) having a flexible cargo unit (14) suspended between them and a pivoted wheel assembly unit (13) attached to one of the framework units (11) and provided with members to vary the angular orientation of the wheel assembly unit (13) relative to the framework units (11) (12) and, a removeable support unit (15) which will change the apparatus (10) from a chaise lounge/wheelbarrow configuration to a chair configuration.

7 Claims, 4 Drawing Sheets

COMBINED BEACH CHAIR AND WHEELBARROW APPARATUS

TECHNICAL FIELD

The present invention relates to the field of wheelbarrow constructions in general and in particular to convertible and collapsible articulated wheelbarrow constructions.

BACKGROUND ART

This invention was the subject matter of Document Disclosure Program Registration No. 160,149 which was filed in the U.S. Patent and Trademark Office on Dec. 4, 1986.

As can be seen by reference to the following U.S. Pat. Nos. 3,826,511; 4,261,590; 2,896,960; and 2,967,058; the prior art is replete with myriad and diverse collapsible wheelbarrow constructions.

While all of the aforementioned prior art constructions are more than adequate for the basic purpose and function for which they have been specifically designed, these prior art devices are severely limited in both the number and variation of useful configurations available to the user between the fully collapsed and the fully extended dispositions of the patented wheelbarrow constructions.

In essence it seems that the state of the art in this particular area of technology has barely advanced beyond the collapsible or flexible wheelbarrow receptacle stage; and, has not even approached the point wherein pivoted or articulated frame components have been more than superficially investigated.

As a consequence of the foregoing situation, there has existed a longstanding need among users of wheelbarrows in general for a multiple use wheelbarrow construction which employs an articulated framework having both moveable and slideable components to produce a variety of useful configurations; and, the provision of such a construction is a stated objective of the present invention.

DISCLOSURE OF THE INVENTION

Briefly stated, the combined beach chair and wheelbarrow apparatus that forms the basis of the present invention comprises: a front framework unit; a rear framework unit pivotally attached to the front framework unit; a wheel assembly unit operatively associated with the front framework unit; a flexible cargo handling unit operatively attached to both the front and rear framework units; and, a moveable support unit operatively associated with the flexible cargo handling unit and the framework units to produce a variety of useful cargo transport and personal support configurations.

As will be explained in greater detail further on in the specification, the combined beach chair and wheelbarrow apparatus not only provides a means of transporting a fairly large cargo while in the wheelbarrow configuration for transporting items such as coolers, radios, umbrellas, fishing tackle, and other miscellaneous items from one location to another; but, also allows the user to manipulate and adjust the framework units and supports to produce any one of the following conventional beach chair configurations: a high and low angle chaise lounge type backrest and a chair having a high angle and a low angle back support.

BRIEF DESCRIPTION OF THE DRAWINGS

These and other attributes of the invention will become more clear upon a through study of the following description of the best mode for carrying out the invention, particularly when reviewed in conjunction with the drawings, wherein.

BEST MODE FOR CARRYING OUT THE INVENTION

Figure 1:
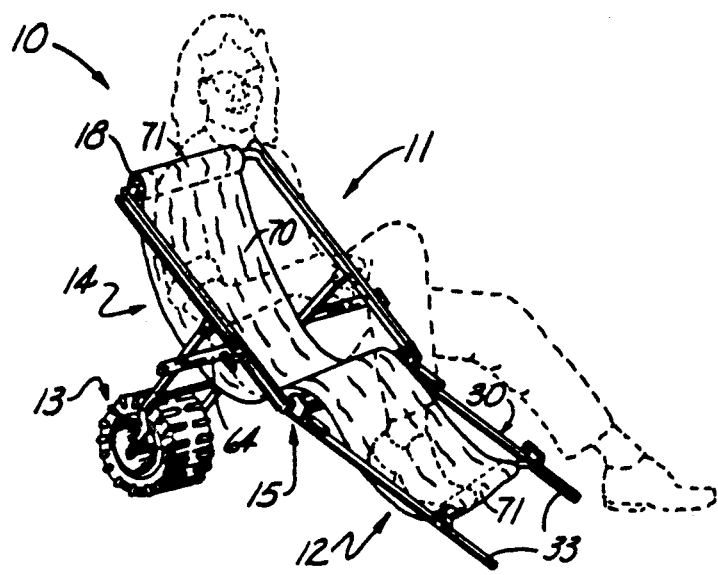
FIG. 1 is a front perspective view of the apparatus deployed in a chair configuration.
Figure 2:
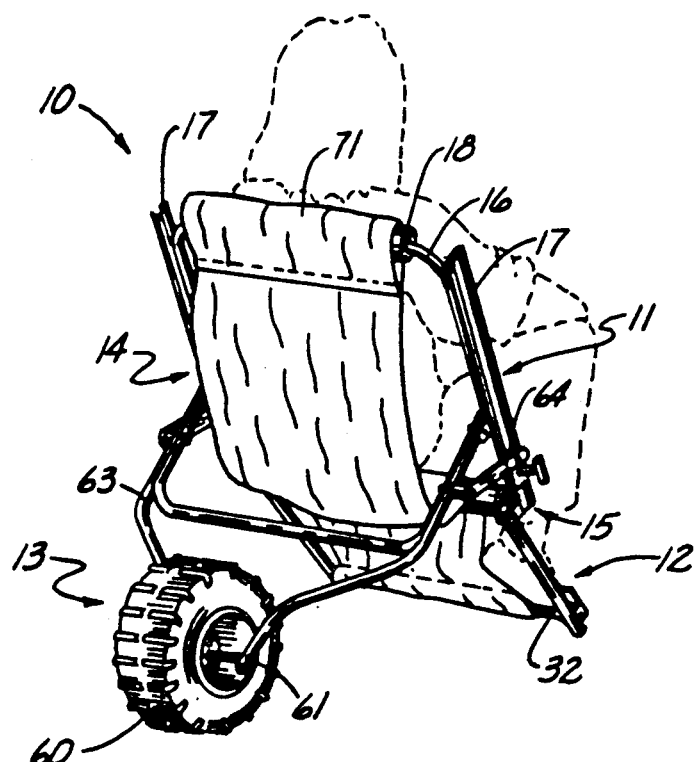
FIG. 2 is a rear perspective view of the apparatus deployed in the chair configuration.

As can be seen by reference to the drawings, and in particular to FIGS. 1 and 2, the combined wheelbarrow and beach chair apparatus that forms the basis of the present invention is designated generally by the reference number (10). The apparatus (10) comprises in general: an upper framework unit (11); a lower framework unit (12); a wheel assembly unit (13); a flexible cargo unit (14); and a moveable support unit (15). These units will now be described in seriatim fashion.

As shown in FIGS. 1 through 5, the upper framework unit (11) comprises a generally inverted U-shaped upper tubular framework member (16) having a pair of apertured channel members (17) disposed along the sides of the framework member (16) and a rolled cushion member (18) operatively attached to the top of the inverted U-shaped framework member (16).

In addition the upper framework member (16) is further provided with a first (19) and a second (20) pair of downwardly depending apertured pivot lug elements;

wherein the first pair of pivot lug elements (19) are disposed proximate to, but spaced from the upturned hollow tubular ends (16') of the upper framework member (16); and, wherein the second pair of pivot lug elements (20) are disposed proximate the midpoint of the upper framework member (16).

Still referring to FIGS. 1 through 5, it can be seen that the lower framework unit (12) comprises a generally H-shaped lower tubular framework member (30) having a pair of tubular arm elements (31) connected together by a cross-piece element (32) which is disposed proximate to, but spaced from, the outboard end of the tubular arm elements (31).

Figure 10:
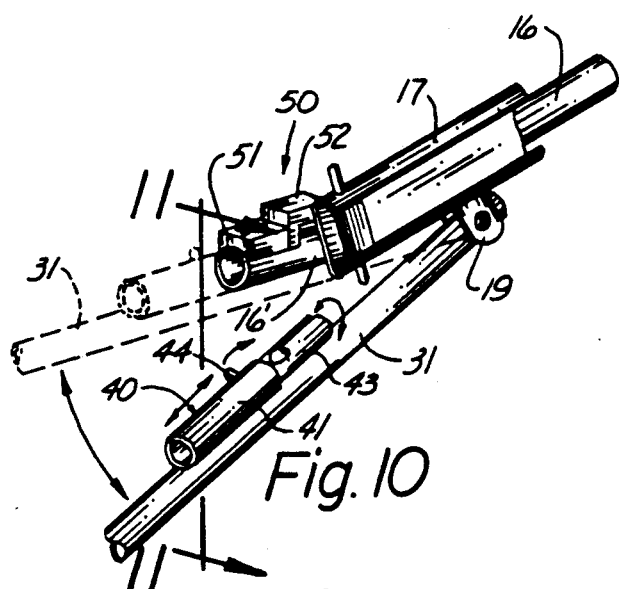
FIG. 10 is a perspective view of the releasable coupling between the front and the rear framework units.
Figure 11:
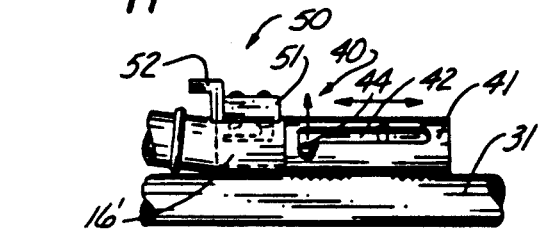
FIG. 11 is an enlarged detail view of the engaged releasable coupling structure.
Figure 8:
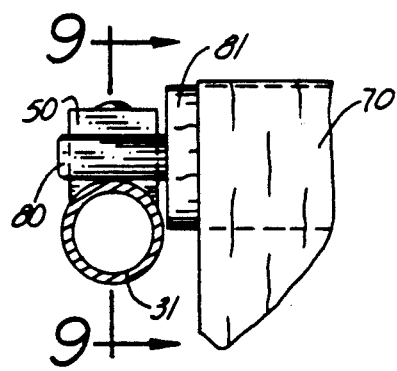
FIG. 8 is an enlarged front cross-sectional view of the moveable support unit engaged in one of the framework units taken through line 8—8 of FIG. 5.
Figure 9:
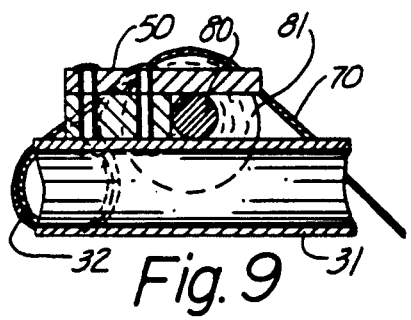
FIG. 9 is an enlarged side cross-sectional view of the moveable support unit as taken through line 9—9 of FIG. 8.
Figure 12:
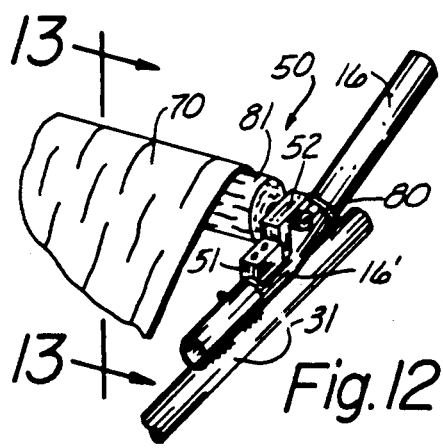
FIG. 12 is a perspective view of the operative engagement between the moveable support unit, the flexible cargo handling unit, and one of the frame units.
Figure 13:
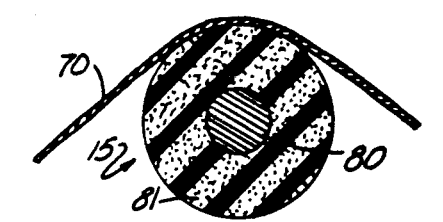
FIG. 13 is a cross-sectional view of the cargo handling unit and the moveable support unit as taken through line 13—13 of FIG. 12.
Figure 14:
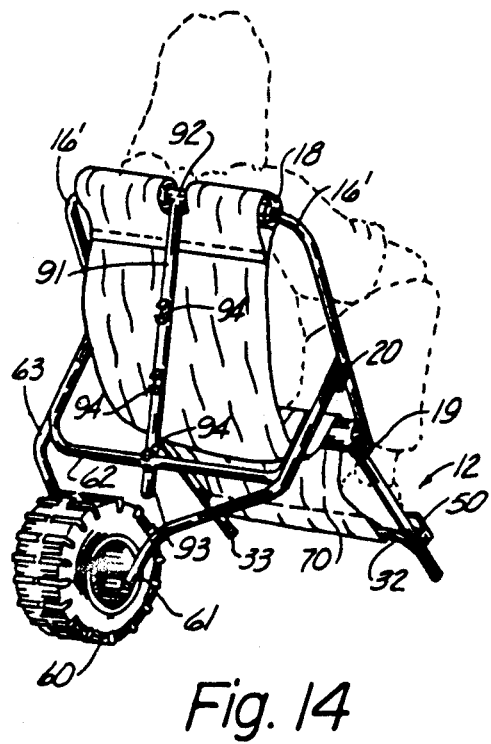
FIG. 14 is a rear perspective view of an alternate version of the preferred embodiment.

In addition, the inboard ends of the lower tubular framework member (30) are pivotally secured to the first pair of pivot lugs (19) on the inboard ends of the upper tubular framework member (16), in a well recognized fashion, to form the first operative connection between the upper (11) and lower (12) framework units. Furthermore the outboard ends of the lower tubular framework member (30) form handle elements (33) for the apparatus (10). As can best be seen by reference to FIGS. 10 and 11, the inboard portions of the tubular arm elements (31) are further provided with releasable locking mechanisms (40) which form a second selectively engageable operative connection between the upper (11) and lower (12) framework units. The releasable locking mechanisms (40) comprise a tubular housing member (41) disposed on top of the tubular arm elements (31) at a point spaced from the inboard ends of the arm elements; wherein, each of the housing members (41) are provided with an elongated J-slot (42).

In addition each of the housing members (41) are provided with an interior reduced diameter tubular engaging element (43) which is dimensioned to be slideably received both within the housing members (41) and the upturned inboard ends (16'); wherein, the upper (11) and lower (12) framework units may be fixedly yet releasably secured relative to one another. Furthermore each of the tubular engaging elements (43) are provided with an acutator rod (44) which is dimensioned to be slideably received in the J-slots (42) of the housing member (40) to permit the retraction and extension of the engaging elements (43) relative to both the housing members (41) and the inboard ends (16') of the upper framework member (16).

Turning now to FIGS. 3, 5, 9, and 12, it can be seen that the apparatus (10) is further provided with a plurality of opposed pairs of catch members (50). In the preferred embodiment of the invention depicted in the drawings the catch members (50) are disposed in opposed pairs at a location spaced from the outboard ends of the lower framework member (30) and proximate to the inboard ends (16') of the upper framework member (16). The catch members (50) each comprise a bracket element (51) having an outwardly projecting catch arm (52) which is generally spaced above and aligned with the top of the tubular sides of the upper (11) and lower (12) framework units; wherein, the purpose and function of the catch members (50) will be described in greater detail further on in the specification.

As can best be seen in FIGS. 1 through 3 and 5, the wheel assembly unit (13) comprises a wheel member (60) mounted on an axle (61) whose opposite ends are connected to the outboard end of an axle yoke (63) having a crosspiece (62); wherein, the inboard ends (63') of the axle yoke (63) are pivotally secured to the second pair of pivot lugs (20) which are secured to the upper framework member (16).

In addition the wheel assembly unit (13) further comprises linkage arms (64) pivotally secured on one end to the upper portions of the axle yoke (63) and pivotally secured on their other ends to elongated slide members (65) which are dimensioned to be slideably received in the apertured channel members (17) on the upper framework member (16). Furthermore the slide members (65) are also provided with releasable detent means (66), whose purpose and function will be described presently.

Figure 6:
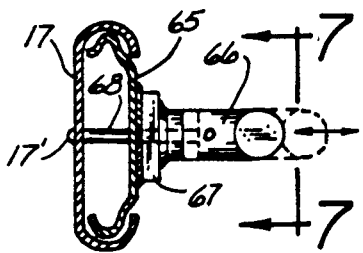
FIG. 6 is a cross-sectional view of one of the slide release elements taken through line 6—6 of FIG. 5.
Figure 7:
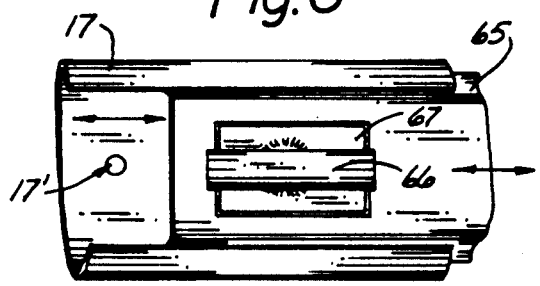
FIG. 7 is a front plan view of the slide release disposed in one of the slide support channels.

As shown in FIGS. 6 and 7, the releasable detent means (66) comprise a base plate (67) mounted on each of the slide members (65) to support a plunger rod (68) dimensioned to be received in the plurality of apertures (17') which are disposed at spaced locations along the length of the channel members (17); whereby, the linkage arms (64) can be disposed at a variety of locations on both sides of the second pair of pivot lugs (20).

Figure 3:
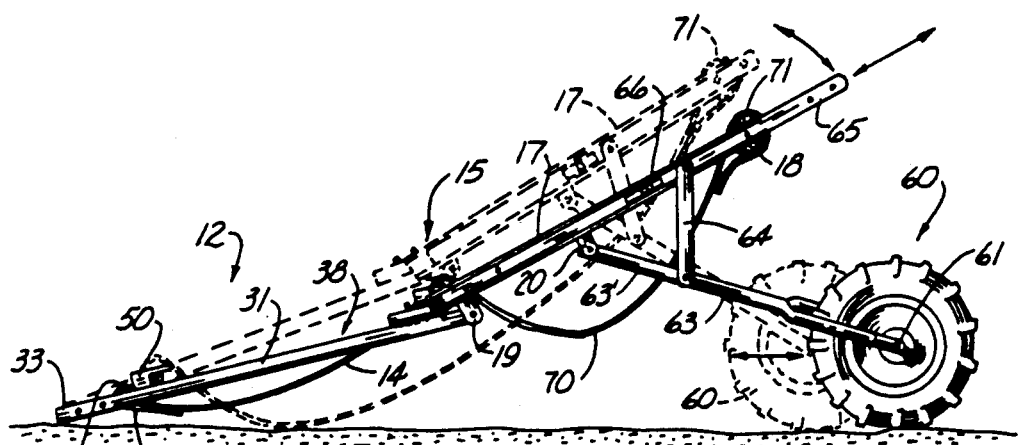
FIG. 3 is a side elevation view of the apparatus illustrating both the chair and chaise lounge configurations.
Figure 4:
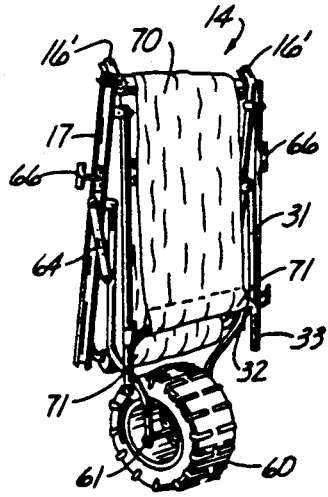
FIG. 4 is a perspective view of the apparatus in its collapsed configuration.
Figure 5:
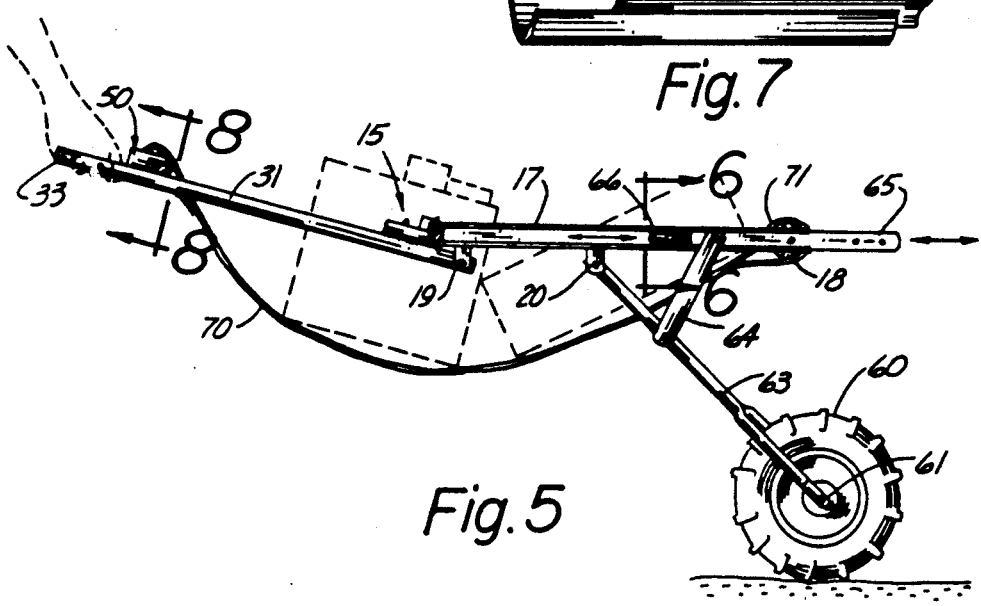
FIG. 5 is a side elevation view of the apparatus in its wheelbarrow configuration.

In the disposition depicted in FIGS. 1 and 2 the linkage arms (64) are oriented toward the juncture of the upper (11) and lower (12) framework units to produce the high angle chair and chaise lounge configurations of the apparatus (10); and, in the disposition illustrated in FIGS. 3 and 5, the linkage arms (64) are oriented towards the outboard end of the upper framework unit (11) to produce the low angle chair and chaise lounge as well as the wheelbarrow configurations of the apparatus (10).

As can best be seen by reference to FIGS. 1 through 5 the flexible cargo unit (14) comprises a generally rectangular flaccid fabric member (70) having looped ends (71) which encircle the cross-piece element (32) of the lower framework member (30) and the padded upper end (18) of the upper framework member (16) to suspend the flexible cargo unit within the framework units (11) and (12), in a well recognized fashion.

Turning now to FIGS. 8, 9, 12, and 13 it can be seen that the removeable support unit (15) comprises a support bar (80) surrounded by a padded collar (81) wherein the ends of the support bar (80) are dimensioned to be releaseably engaged between the catch arms (52) of the catch members (50) and the top surface of the respective framework units (11) and (12); wherein, the removeable support unit (15) may be selectively positioned at the lower end or the middle of the apparatus (10).

When the user desires to employ the apparatus (10) in either the wheelbarrow configuration of FIG. 5 or the chaise lounge configuration depicted in phantom FIG. 3, the removeable support unit (15) is engaged on one end of the apparatus (10); and, when the user desires the chair configuration depicted in solid lines in FIG. 3, the removeable support unit (15) is disposed in the middle of the apparatus (10).

Furthermore the user may also change the angle of both the chaise lounge and chair configurations of the apparatus (10) simply by moving the linkage arms (64) by means of the slide members (65) and detent means (66) on opposite sides and at different spacings relative to the pivoted connection as at (20) between the wheel assembly unit (13) and the upper framework unit (11).

In the alternate version of the apparatus (10') depicted in FIGS. 14 through 17, it can be seen that a pivoted support brace (90) as been substituted for the channel members (17) linkage arms (64) slide members (65) and releasable detent means (66) of the preferred embodiment of the apparatus (10) to reduce the weight and simplify the construction of the alternate version (10') while maintaining all of the functions of the preferred embodiment (10).

As shown in FIGS. 14 through 17, the support brace (90) comprises an elongated support brace arm (91) which is pivotally secured on the upper end (92) to the top (16') of the U-shaped upper framework member (16); and which is further provided on the lower end (93) with a plurality of spaced releasable clamp elements (94).

Figure 15:
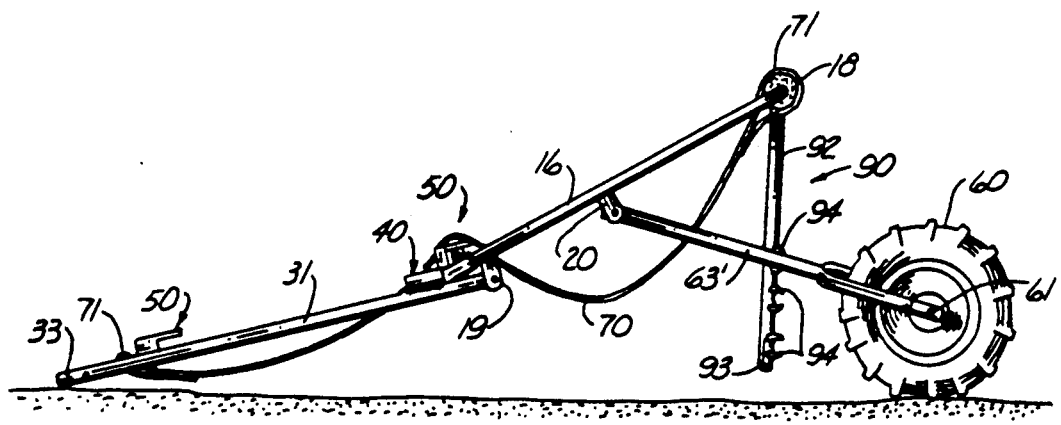
FIG. 15 is a side elevation of the alternate version in the chaise lounge configuration.
Figure 16:
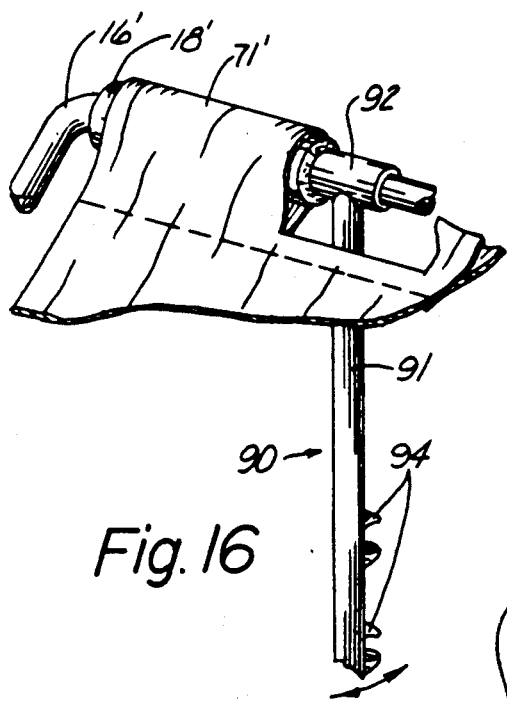
FIG. 16 is an enlarged detail view of the upper end of the adjustable support brace used in the alternate version; and, FIG. 17 is an enlarged detail view of the lower end of the support brace.
Figure 17:
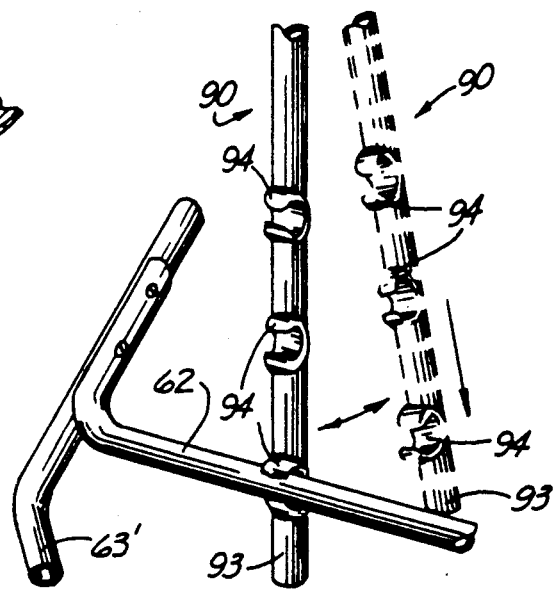

As can best be seen by reference to FIGS. 15 and 17, the releaseable clamp elements (94) comprise generally C-shaped clamps which are dimensioned to releasably engage the periphery of the crosspiece (62) which extends between the axle yoke (63) of the wheel assembly unit (13); such that the upper framework member (16) may be disposed at different angular orientations relative to the wheel assembly (13).

Having thereby described the subject matter of the present invention, it should be apparent that many substitutions, modifications and variations of the invention are possible in light of the above teachings. It is therefore to be understood that the invention as taught and described herein is only to be limited to the extent of the breadth and scope of the appended claims.

I claim:

1. A combined wheelbarrow and beach chair apparatus comprising:
   a first framework member;
   a second framework member pivotally connected on one end of said first framework member;
   a pair of cooperating locking mechanism provided on said first and second framework members for releasably securing the first and second framework members together; wherein the cooperating locking mechanisms comprise a pair of tubular housing members operatively attached to a selected one of the first and second framework members; and, a pair of tubular engaging elements slideably disposed within the pair of housing members; wherein, the tubular engaging elements are dimensioned to operatively engage one end of the other one of the first and second framework members;
   a flexible cargo unit suspended between the said first and said second framework members;
   a moveable support unit adapted to be interposed between the flexible cargo unit and at least one of the framework members, to vary the suspended configuration of the cargo unit relative to both of the said framework members; and,
   a wheel assembly unit including: a wheel member mounted on an axle member which includes opposite ends connected to an axle yoke, wherein the axle yoke is pivotally connected on one end to a selected one of said framework members; and is further provided with means interconnected between the axle yoke and one of the frame members for selectively varying the angular disposition of the axle yoke relative to the selected one of said framework members.

2. The apparatus as in claim 1; wherein, the housing elements are further provided with catch members which are dimensioned to releasably engage said moveable support unit.

3. The apparatus as in claim 2; wherein, said means for selectively varying the angular disposition of the axle yoke relative to the selected one of said framework members comprises
   a linkage operatively and pivotally connected between the axle yoke and one of the framework members wherein the pivoted connections between the axle yoke and said one of the framework members allows the linkage to be deployed on opposite sides of the axle yoke.

4. The apparatus as in claim 1; wherein, the wheel assembly unit further comprises:
   a crosspiece which extends across the axle yoke and is interconnected therewith; and, wherein, said means for selectively varying the angular disposition of the axle yoke relative to at least one of said framework members comprises:
   a support brace extends between and connect with the wheel assembly unit and at least one of said framework members.

5. The apparatus as in claim 4; wherein, the support brace is pivotally secured on one end to one of said framework members.

6. The apparatus as in claim 5; wherein, the support brace is provided with releasable securing means on the other end for selectively and releasably engaging said wheel assembly unit.

7. The apparatus as in claim 6; wherein, the releasably securing means comprise a plurality of releasable clamp elements disposed in a spaced relationship along the length of said support brace.

* * * * *